(12) United States Patent
Michel et al.

(10) Patent No.: US 8,500,133 B2
(45) Date of Patent: Aug. 6, 2013

(54) WHEEL SUSPENSION FOR A MOTOR VEHICLE

(75) Inventors: Wilfried Michel, Riedenburg (DE); Karl-Heinz Meitinger, München (DE); Christoph Kossira, Ingolstadt (DE); Hugo Müller, Rohrenfels-Ballersdorf (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/319,822

(22) PCT Filed: Apr. 21, 2010

(86) PCT No.: PCT/EP2010/002427
§ 371 (c)(1),
(2), (4) Date: Nov. 10, 2011

(87) PCT Pub. No.: WO2010/130329
PCT Pub. Date: Nov. 18, 2010

(65) Prior Publication Data
US 2012/0049469 A1    Mar. 1, 2012

(30) Foreign Application Priority Data
May 13, 2009 (DE) .......................... 10 2009 021 093

(51) Int. Cl.
*B62D 17/00* (2006.01)
(52) U.S. Cl.
USPC .................. 280/5.52; 280/86.751; 280/86.758
(58) Field of Classification Search
USPC ........ 280/5.52, 5.521, 5.522, 86.751, 86.758, 280/86.75, 86.754
See application file for complete search history.

(56) References Cited

U.S. PATENT DOCUMENTS

| 5,009,447 A * | 4/1991 | Gabel ........................ 280/5.521 |
| 8,162,332 B2 * | 4/2012 | Michel et al. ............ 280/86.751 |
| 2003/0011157 A1 * | 1/2003 | Aubarede et al. ........ 280/86.751 |
| 2007/0080513 A1 * | 4/2007 | Osterlanger et al. ..... 280/86.751 |
| 2012/0193882 A1 * | 8/2012 | Michel et al. ............ 280/86.751 |

FOREIGN PATENT DOCUMENTS

| DE | 46782 | 4/1889 |
| DE | 39 28 135 A1 | 3/1990 |
| DE | 198 36 658 A1 | 3/2000 |
| DE | 102 49 159 A1 | 6/2003 |
| DE | 102004049296 | 4/2006 |
| DE | 102005025039 | 12/2006 |
| DE | 201008011367 | 4/2009 |
| GB | 449608 | 7/1936 |
| WO | WO 98/16418 | 4/1998 |
| WO | WO 2005/047030 | 5/2005 |

* cited by examiner

*Primary Examiner* — Drew Brown
(74) *Attorney, Agent, or Firm* — Henry M. Feiereisen LLC

(57) ABSTRACT

The invention relates to a wheel suspension for a motor vehicle, comprising a wheel-side carrier part (12) holding a vehicle wheel (1) in a rotatable manner, and an axle-side guiding part (14) between which mutually rotating rotary parts (16, 18) are arranged. The guiding part (14), the rotary parts (16, 18) and/or the carrier part (12) interact with first and second effective areas (18a, 36a; 18b, 16b; 16a, 54a) facing each other. According to the invention, the first effective area radially defines a conical or spherical hollow profile into which the corresponding second effective area protrudes in an essentially form-fitting manner.

18 Claims, 5 Drawing Sheets

WHEEL SUSPENSION FOR A MOTOR VEHICLE

CROSS-REFERENCES TO RELATED APPLICATIONS

This application is the U.S. National Stage of International Application No. PCT/EP2010/002427, filed Apr. 21, 2010, which designated the United States and has been published as International Publication No. WO 2010/130329 and which claims the priority of German Patent Application, Serial No. 10 2009 021 093.8, filed May 13, 2009, pursuant to 35 U.S.C. 119(a)-(d).

BACKGROUND OF THE INVENTION

The invention relates to a wheel suspension of a motor vehicle.

In so-called active steering systems, especially for the rear axle of vehicles, the wheel camber or the wheel toe can be adjusted via an actuator so that handling of the motor vehicle can be influenced by controlling the actuator.

DE 10 2004 049 296 A1 discloses a generic wheel suspension for a motor vehicle. It includes a hub unit which rotatably supports the vehicle wheel, and an axle-side guide part, with rotary parts being disposed between the hub unit and the guide part. The rotary part facing the hub unit is a cylindrical adjusting ring having cylindrical inner and outer effective areas which interact with corresponding effective areas of the other rotary part and the hub unit. The rotation axes of both rotary parts are aligned at a slant in relation to one another. When the two rotary parts are rotated, the wheel toe or the wheel camber can be adjusted.

Both rotary parts can be rotated in any relation to one another by servo drives. The desired toe-in/camber adjustment can be established in dependence on the combination of the rotation angles. In the extreme case, the resultant diffraction angle may be in the order of several angle degrees. This means that the carrier part can be positioned at a slant at an angle of several angle degrees in relation to the guide part which is mounted with further suspension arms to the vehicle body.

SUMMARY OF THE INVENTION

The invention is based on the object to provide a wheel suspension which allows a reliable support of encountered radial forces and axial forces.

The object is solved by a wheel suspension for a motor vehicle, including a wheel-side carrier part rotatably supporting a vehicle wheel, and an axle-side wide part between which rotary parts are arranged and rotatable in relation to one another, with the guide part, the rotary parts and/or the carrier part interacting with facina first and second effective areas, wherein the facing effective areas between the guide part, the rotary part and/or the carrier part of the wheel suspension are not configured cylindrically but a first effective area may radially delimit a conical or spherical hollow profile in which the second facing effective area is able to at least substantially engage formfittingly.

The inventive idea may conceivably include different variants of the two facing effective areas: For example, both facing effective areas may have conical configuration, or a first one of the effective areas may be configured as spherical cup whereas the second effective area may have a corresponding spherical configuration to engage this spherical cup. As an alternative, the first effective area can be conical whereas the second effective area is a surface in the shape of a spherical disk to thereby establish a conical socket/spherical disk bearing.

According to a preferred embodiment, the two rotary parts placed between guide part and carrier part may form an actuator for adjusting a toe angle and/or camber angle. The facing effective areas can hereby be dimensioned between the two rotary parts in such a way as to slantingly position the rotation axis of the one rotary part in relation to the rotation axis of the other rotary part by an inclination angle.

In accordance with a variant, the facing effective areas can contact one another directly or through intervention of a friction-reducing coating so as to provide overall a cost-efficient and durable slide bearing between both effective areas.

As an alternative, the facing effective areas can be connected to one another via a roller bearing. This may be a tapered roller bearing when the effective areas have a conical configuration.

According to the invention, three bearing points are established between the four-part wheel carrier comprised of carrier part, the two rotary parts and the guide part. In order to reliably absorb axial and radial forces, it is of advantage to configure each of the bearing points with tapered roller bearings.

As described above, the second rotary part has an effective area which faces the first rotary part and an effective area which faces the guide part. For a particularly compact construction that is stable in axial direction, these two effective areas may be expanded in opposite directions to one another on the second rotary part.

As described above, the first rotary part has in contrast thereto an effective area which faces the carrier part and an effective area which faces the second rotary part, with both effective areas being expanded in a same direction in a conical or spherical manner.

In light of this background, the second rotary part may include in axial direction on both sides a conical or spherical hollow profile, respectively, for engagement of the first rotary part on one hand and also the guide part on the other hand. The carrier part can be further arranged with its effective area radially inwards of the first rotary part for better use of installation space.

The wheel-side carrier part and the axle-side guide part can be fixed by a restraining means. In particular, the restraining means can apply a biasing force to maintain the guide and carrier parts under tension in the axial direction. As a result of such a securement or bracing of the carrier and guide parts, the bearing points can be exposed to loads, in particular axial compressive forces and radial forces, while axial pulling forces may be absorbed by the restraining means itself.

With regard to assembly, it is beneficial to interconnect the four parts of the wheel carrier, comprised of carrier part, the rotary parts and the guide part, in an assembly direction roughly by a plug-in connection, without the need for an undercutting construction to axially fix the parts. The assembly may be implemented by simply plugging the parts together. For structural reasons, it is furthermore preferred when the restraining means connects the guide part and the carrier part with one another, wherein the restraining means can be arranged radially outside the rotary parts.

The restraining means may at the same time act as a coupling between the carrier part and the guide part. The coupling can again transmit as a torque bridge a torque, such as a braking torque, from the carrier part onto the guide part and thus to the vehicle body. The restraining means may hereby be configured preferably as cardan joint or metal bellows.

BRIEF DESCRIPTION OF THE DRAWING

The invention will now be described with reference to several exemplified embodiments.

It is shown in.

DETAILED DESCRIPTION OF PREFERRED EMBODIMENTS

Figure 1:
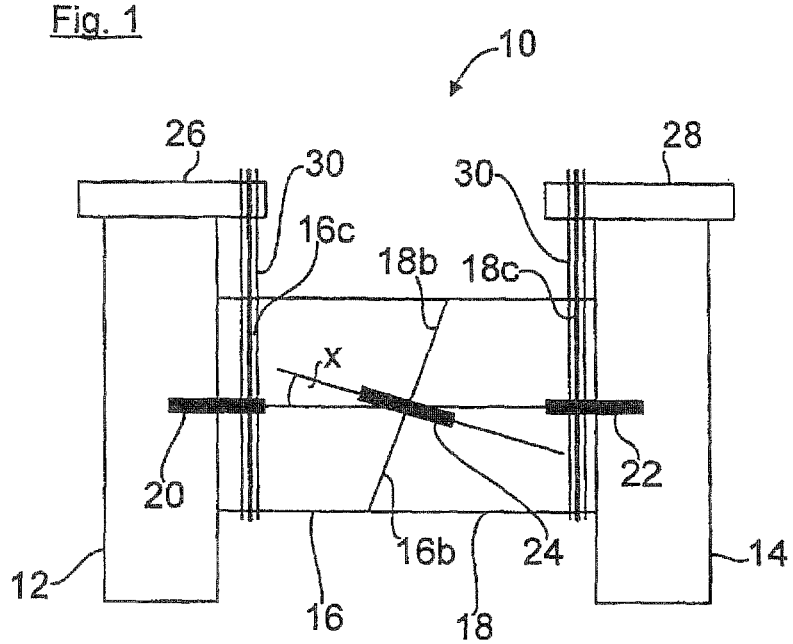
FIG. 1 a basic representation of the device for adjusting toe and camber angles of a wheel suspension for motor vehicles with a multi-part wheel carrier.

For a theoretical explanation of the invention, FIG. 1 shows a rough basic representation of a wheel carrier 10 of a wheel suspension for motor vehicles, which carrier is subdivided for adjustment of the camber and/or toe of the vehicle wheel as follows:

The wheel carrier 10 has a carrier part 12 in which the wheel and the brake element (brake disk, brake drum) of a service brake of the motor vehicle is rotatably supported. It should be noted that any functional parts of the wheel suspension that have not been described can be of conventional structure.

The wheel carrier 10 further includes a guide part 14 which interacts with the wheel suspension or optionally may form part of the wheel suspension.

Two substantially rotation-symmetrical rotary parts 16, 18 are provided as actuators between the carrier part 12 and the guide part 14 and are connected for rotation with the carrier part 12 and the guide part 14, respectively, via respective rotation axes 20, 22. Both rotation axes 20, 22 are oriented coaxially in the figures and extend in the wheel rotation axis.

Whereas the contact surfaces of the rotary parts 16, 18 directly adjacent to the carrier part 12 and the guide part 14 are configured rotation-symmetrically, the rotary parts 16, 18 bear upon one another via slanted surfaces 16b, 18b in such a way that the rotary part 16 pivots about a rotation axis 24 which is inclined upwards in FIG. 1. The rotation axis 24 is thus oriented, as shown, perpendicular to the slanted surfaces 16b, 18b and inclined at a defined angle x in relation to the rotation axis 22.

Figure 4:
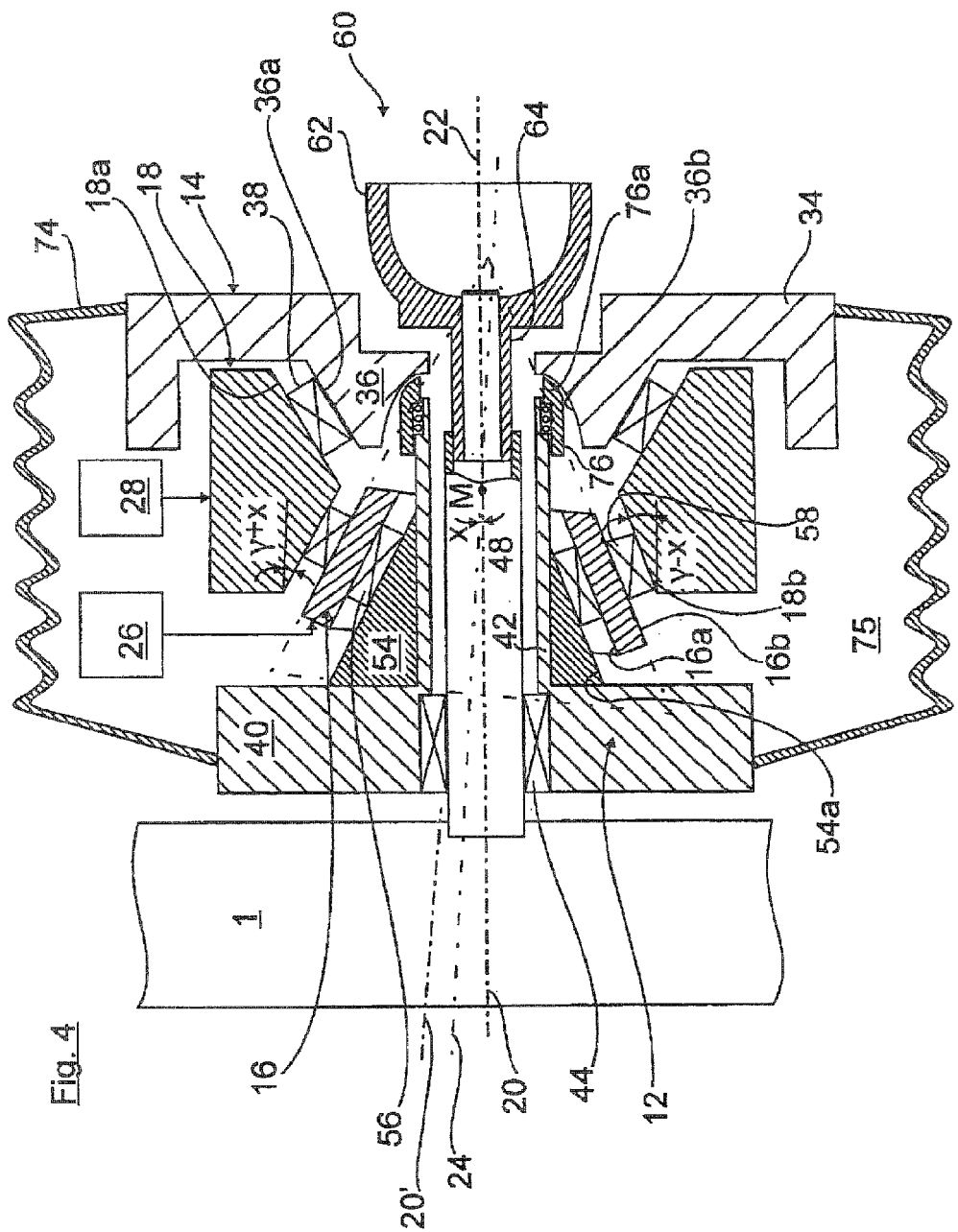
FIG. 4 a greatly simplified view of the device for illustration of the adjustment mechanism.

In FIG. 1, the center axis 20 of the carrier part 12 is oriented in coaxial relation to the rotation axis 22 of the guide part 14 so that the vehicle wheel, held on the carrier part 12, is set without camber and toe angles. FIG. 4, which is being described further below, indicates in addition also the center axis 20'. The shown angular disposition of the center axis 20' is established as the rotary parts 16, 18 pivot about a rotation angle of 180°.

Provided on the carrier part 12 and the guide part 13 are electric servomotors 26, 28, respectively, which are connected in driving relationship with the rotary parts 16, 18 in the basic representation via toothed belts 30. The rotary parts 16, 18 can be rotated by the servomotors 26, 28 in same direction or in opposite direction in both rotational directions so that the carrier part 12 executes a pivoting motion or a wobbling motion in order to accordingly change the toe angle and/or the camber angle of the wheel.

Figure 2:
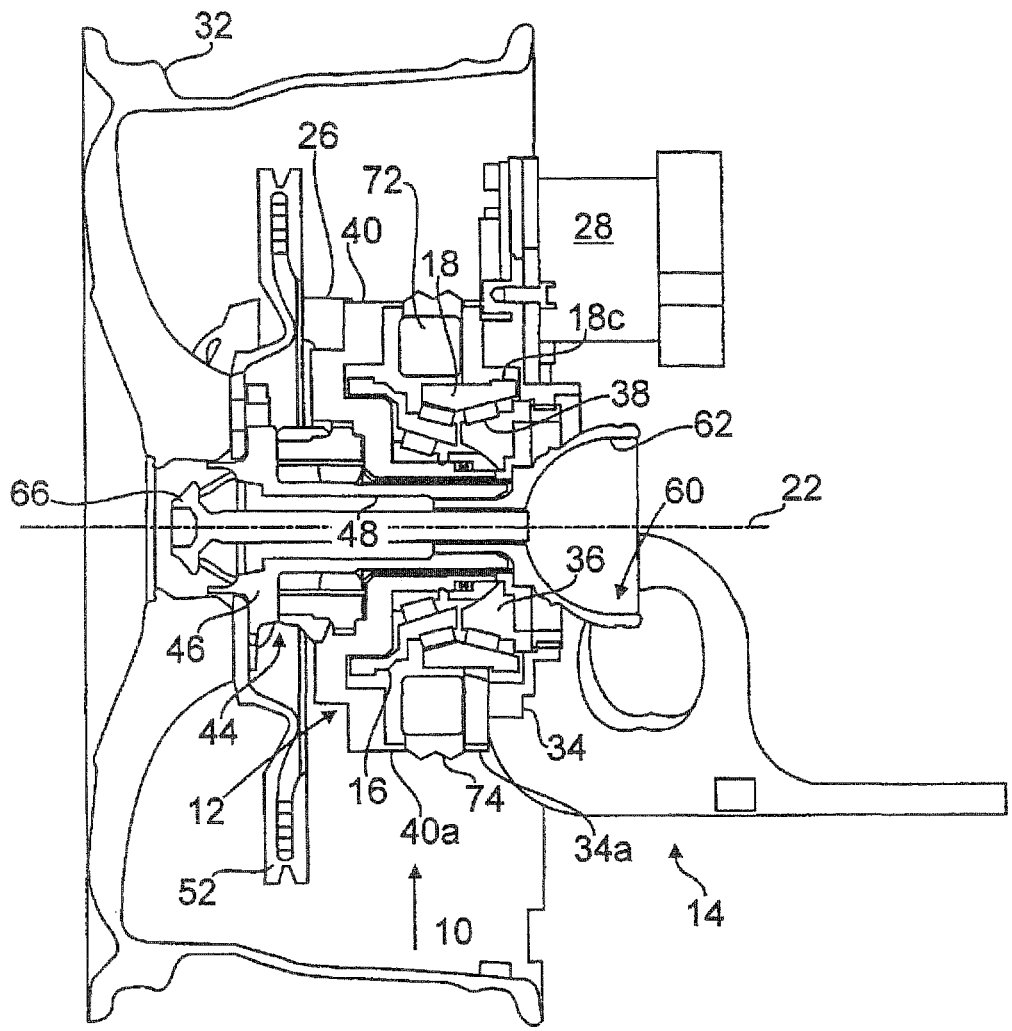
FIG. 2 a concrete implementation of the device according to FIG. 1, having a carrier part which carries a wheel, a guide part which is articulated on wheel guide elements of the wheel suspension, and two pivotable rotary parts which can be adjusted by electric servomotors.
Figure 3:
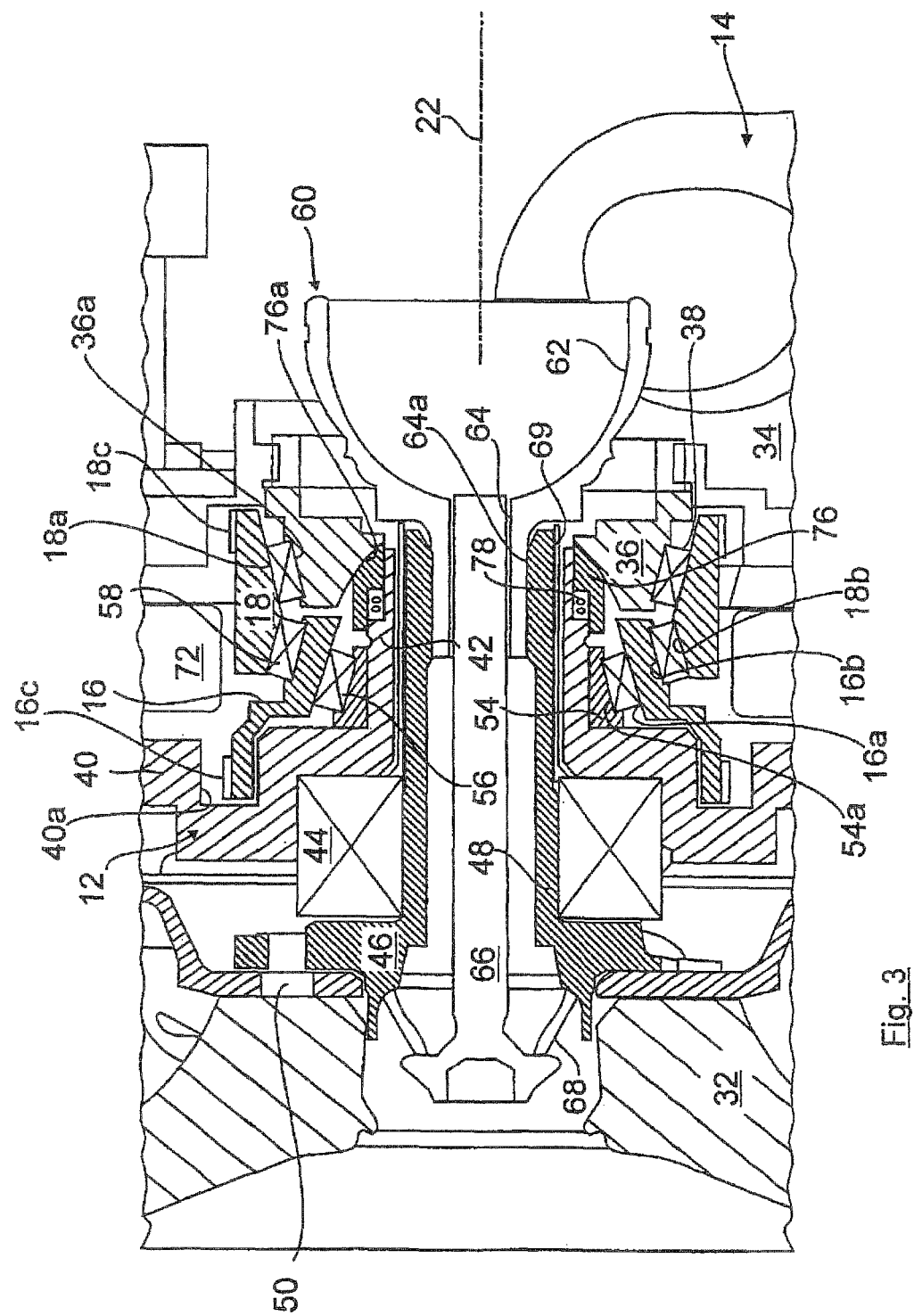
FIG. 3 the device according to FIG. 2 by way of an enlarged illustration of the arrangement and pivotal support of the rotary parts and the carrier and guide parts.

FIGS. 2 and 3 show a longitudinal section of a concrete embodiment of the wheel carrier 10 along the rotation axis 22 of the wheel of the wheel suspension.

As described above, the wheel carrier 10 is comprised of the guide part 14 which is articulated to wheel guide elements such as suspension arms etc., the carrier part 12 which supports the wheel, and the rotation-symmetrical rotary parts 16, 18.

The guide part 14 has a support flange 34 which supports a radially inwardly arranged bearing ring 36. According to FIG. 3, the conical effective area 36a of the bearing ring 36 faces the conical effective area 18a of the radially outwardly arranged rotary part 18. The bearing ring 36 forms via bearing rollers 38 with the radially outwardly arranged rotary part 18 a first tapered roller bearing which is defined by a rotation axis in coincidence with the rotation axis 22.

The rotary part 18 has an outer circumference provided with a gear rim 18c which interacts in driving relationship with an invisible drive gear of the electric servomotor 28. The servomotor 28 is also mounted to the support flange 34 of the guide part 14.

According to FIG. 3, the carrier part 12 has a radially aligned flange portion 40 and an axially extending hub portion 42. The hub portion 42 extends radially within the two rotary parts 16, 18 up to a level with the bearing ring 36 of the support flange 34.

Provided within the flange portion 40 is a wheel bearing 44 as pivot bearing for a wheel flange 46 which has a hub portion 48 which projects likewise axially to the hub portion 42 also roughly up to the bearing ring 36.

The wheel or the wheel rim 32 and the brake disk 52 of a disk brake are fastened to the wheel flange 46 by wheel bolts 50 (shown also partially). The caliper of the disk brake is fastened to the flange portion 40 of the carrier part 12 in a manner which is not apparent.

Furthermore, the rotary part 16 is rotatably supported on the hub portion 42 via an inner bearing ring 54 and a tapered roller bearing 56, with the rotation axis of the hub portion also coinciding with the wheel rotation axis 22. The inner bearing ring 54 and the radially outer rotary part 16 have facing conical effective areas 54a and 16a between which the tapered roller bearing 56 is provided.

The rotary part 16 is further rotatably supported in the rotary part 18 via a third tapered roller bearing 58 with bearing rollers. The relevant conical effective areas 16b, 18b are hereby slantingly configured in relation to the rotation axis 22 so that a rotation causes adjustment of the camber angle and/or toe angle of the wheel from the neutral position in a range of about 5°.

According to FIG. 3, the rotary part 16 engages into an axial groove 40a of the flange portion 40 and supports an outer gear rim 16c which is connected in driving relationship with the servomotor 26 via a hidden drive gear and through a recess in the flange portion 40. The servomotor 26 is respectively fastened to the flange portion 40 of the carrier part 12.

The wheel flange 46 is operated via a cardan shaft 60, shown only in part by way of its bell-shaped joint housing 62 and the sleeve-shaped driving journal 64 for the sake of simplicity. The driving journal 64 is inserted via a spline 64a into the hub portion 48 of the wheel flange 46 and tightened by a locking bolt 66 with a locking sleeve 68 against the wheel flange 46. A distance sleeve 69 is supported between a ring shoulder of the bell-shaped joint housing 62 and the wheel bearing 44 and arranged in coaxial relationship to and in radial direction between the hub portions 42, 48 of the carrier part 12 and the wheel flange 46. The locking bolt 66 thus braces the assembly comprised of locking sleeve 68, wheel flange 46, wheel bearing 44, distance sleeve 69, and cardan shaft 60.

According to FIGS. 2 and 3, a cardan ring 72 is provided radially outside the rotary parts 16, 18 as restraint against rotation between the guide part 14 and the carrier part 12 and is guided on the flange portion 40 of the carrier part 12 in circumferential direction in a formfitting manner via, for example, axial catches which project into the cardan ring 72. The cardan ring permits only angular deflections but no relative rotation.

The device for adjustment of the wheel camber and/or toe, as described above, is sealed radially to the outside against environmental impacts such as moisture and dirt by a rubber-elastic bellows 74 (cf. FIG. 2). The bellows 74 is respectively fastened to ring-shaped projections 40a, 34a of the flange portion 40 of the carrier part 12 and the support flange 34 of the guide part 14.

As an alternative, as shown in FIG. 4, the bellows 74 may be configured as thin-walled metallic bellows which is sufficiently torsionally rigid to provide restraint against rotation but yet is sufficiently flexible as to lastingly accommodate the mentioned adjustment angles while sealing the radially inwardly arranged functional parts. The described cardan ring 72 can then be omitted.

A radial inner sealing of the rotary parts 16, 18 and their roller bearings etc. is provided between the bearing ring 36 on the support plate 34 of the guide part 14 and the hub portion 42 of the carrier part 12 in the region of the bell-shaped joint housing 62 of the cardan shaft 60. It should be noted in this context that the carrier part 12 executes a wobbling motion with a pivot center in the middle of the cardan joint at M (FIG. 4) so that sufficient clearance should be provided at the annular gap between the bell-shaped joint housing 62 and the bearing ring 36.

A sleeve-shaped sealing ring 76 is supported on the hub portion 42 for axial displacement to ensure reliable sealing and has on its end face a spherical portion 76a which interacts with a concavely shaped recess 36b in the bearing ring 36.

FIG. 4 shows in a greatly simplified way the adjustment mechanism of the wheel suspension according to the invention. Therefore, the servomotors 26, 28 within the metal bellows 74 are operatively connected with the rotary parts 16, 18 which are indicated by the arrows. As already described with reference to FIG. 3, the rotary part 18 has two effective areas 18a and 18b. The effective areas 18a, 18b are expanded conically in mutually opposite directions.

The effective areas 18b and 16b of both rotary parts 16, 18, which areas are relevant for camber and toe adjustment are inclined upwards at a slant to the rotation axis 22 by a cone angle (y+x) and (y−x), respectively. The conical effective areas 54a, 16a between the bearing ring 54 and the rotary part 16 are hereby nested within one another in axial direction.

Figure 5A:
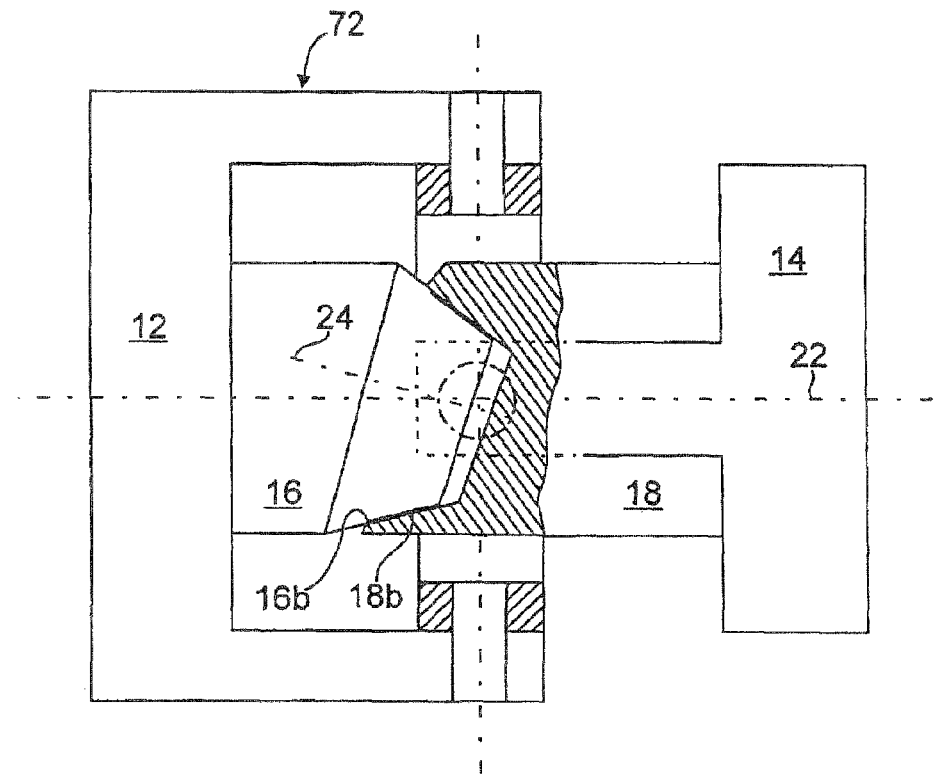
FIGS. 5a to 5c various variants of the effective areas between the two rotary parts.
Figure 5B:
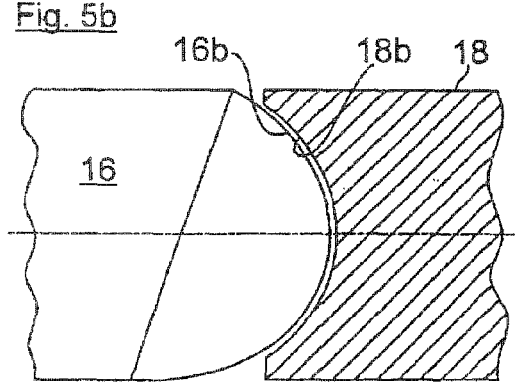
Figure 5C:
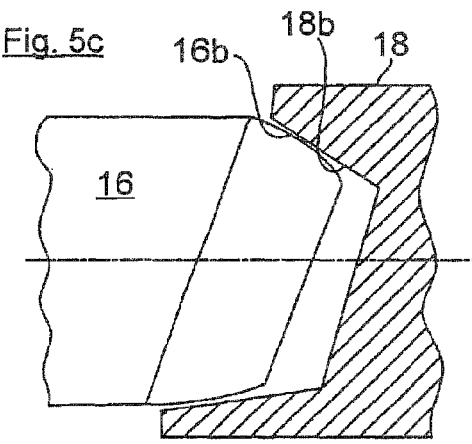

FIGS. 5a to 5c schematically show further variants of the invention. The arrangement shown in FIG. 5a corresponds in its basic structure and mode of operation to the preceding devices. The difference to the preceding devices resides in FIG. 5a in the provision between the rotary parts 16, 18 of a slide bearing in which the conical effective areas 16b, 18b are in direct contact. The rotary parts 16, 18 are moreover in rotating connection with the carrier part 12 and the guide part 14 via not shown radial and axial bearings.

In contrast to FIG. 5a, the slide bearings illustrated in FIGS. 5b and 5c between the rotary parts 16, 18 are not realized using corresponding conical effective areas 16b, 18b. Rather, the effective area 16b of the rotary part 16 is configured in FIG. 5b roughly in the shape of a sphere and in sliding contact with an effective area 18b of the rotary part 18 of concave shape. In contrast thereto, the effective area 16b of the rotary part 16 in FIG. 5c is configured as a surface in the shape of a spherical disk and projects into an effective area 18b configured as a surface in the shape of a conical socket.

The invention claimed is:

1. A wheel suspension for a motor vehicle, comprising:
a wheel-side carrier part rotatably supporting a vehicle wheel;
an axle-side guide part; and
rotary parts arranged between the carrier part and the guide part and rotatable in relation to one another,
wherein at least two members of the group selected from the guide part, the rotary parts and the carrier part interact with facing first and second effective areas, with the first effective area radially delimiting a conical or spherical hollow profile into which the second effective area at least substantially projects formfittingly, wherein the first and second effective areas between the rotary parts are configured such that a rotation axis of one of the rotary parts is positioned at a slant in relation to a rotation axis of another one of the rotary parts by an inclination angle.

2. The wheel suspension of claim 1, further comprising a roller bearing connecting the first and second effective areas.

3. The wheel suspension of claim 1, further comprising a restraint fixing the carrier part and the guide part in an axial direction.

4. The wheel suspension of claim 3, wherein the restraint is configured as coupling which connects the carrier part and the guide part.

5. The wheel suspension of claim 3, wherein the restraint is a cardan joint which is arranged radially outside of the rotary parts.

6. The wheel suspension of claim 3, wherein the restraint is a metal bellows which is arranged radially outside of the rotary parts.

7. The wheel suspension of claim 1, wherein the first and second facing effective areas have a conical shape.

8. The wheel suspension of claim 1, wherein the first effective area is configured as a spherical cup, and the second effective area has a complementary spherical shape.

9. The wheel suspension of claim 1, wherein the first effective area has a conical shape and the second effective area is a surface in the shape of a spherical disk.

10. The wheel suspension of claim 1, wherein the first and second effective areas are in direct contact with one another.

11. The wheel suspension of claim 1, further comprising a friction-reducing coating connecting the first and second effective areas with one another.

12. The wheel suspension of claim 1, wherein the first and second effective areas are formed between any of the two members from the group selected of between the carrier part and one of the rotary parts, between both rotary parts, and between the second rotary part and the guide part.

13. The wheel suspension of claim 1, wherein the effective area on one of the rotary parts in facing relationship to the effective area of the carrier part, and the effective area of the one rotary part in facing relationship with the effective area of the other one of the rotary parts are expanded in a same direction.

14. The wheel suspension of claim 1, wherein the hollow profile on both sides of one of the rotary parts in axial direction is configured for engagement of another one of the rotary parts and for engagement of the guide part.

15. The wheel suspension of claim 1, wherein the two members carrier are connected with one another in an axial assembly direction in the absence of any undercuts.

16. A wheel suspension for a motor vehicle, comprising:
a wheel-side carrier part rotatably supporting a vehicle wheel;
an axle-side guide part;
rotary parts arranged between the carrier part and the guide part and rotatable in relation to one another; and
a roller bearing connecting the first and second effective area, said roller bearing being configured as a tapered roller bearing when the first and second effective areas have a conical shape,
wherein at least two members of the group selected from the guide part, the rotary parts and the carrier part interact with facing first and second effective areas, with the first effective area radially delimiting a conical or spherical hollow profile into which the second effective area at least substantially projects formfittingly.

17. A wheel suspension for a motor vehicle, comprising:
a wheel-side carrier part rotatably supporting a vehicle wheel;
an axle-side guide part; and
rotary parts arranged between the carrier part and the guide part and rotatable in relation to one another,
wherein at least two members of the group selected from the guide part, the rotary parts and the carrier part interact with facing first and second effective areas, with the first effective area radially delimiting a conical or spherical hollow profile into which the second effective area at least substantially projects formfittingly,
wherein the effective area on one of the rotary parts in facing relationship to the effective area of the guide part, and the effective area of the one rotary part in facing relationship with the effective area of the other one of the rotary parts are expanded in mutually opposite directions.

18. A wheel suspension for a motor vehicle, comprising:
a wheel-side carrier part rotatably supporting a vehicle wheel;
an axle-side guide part;
rotary parts arranged between the carrier part and the guide part and rotatable in relation to one another, and
a restraint fixing the carrier part and the guide part in an axial direction, and constructed to apply a predefined biasing force to maintain the carrier part and the guide part under tension,
wherein at least two members of the group selected from the guide part, the rotary parts and the carrier part interact with facing first and second effective areas, with the first effective area radially delimiting a conical or spherical hollow profile into which the second effective area at least substantially projects formfittingly.

* * * * *